March 10, 1970 G. L. CLARK 3,500,236
LASER STABILIZING SYSTEM
Filed Oct. 28, 1966
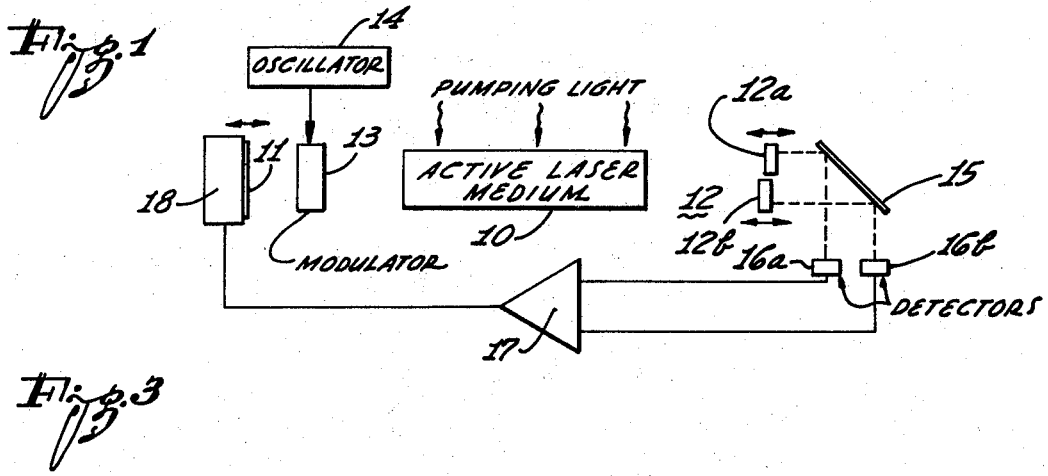
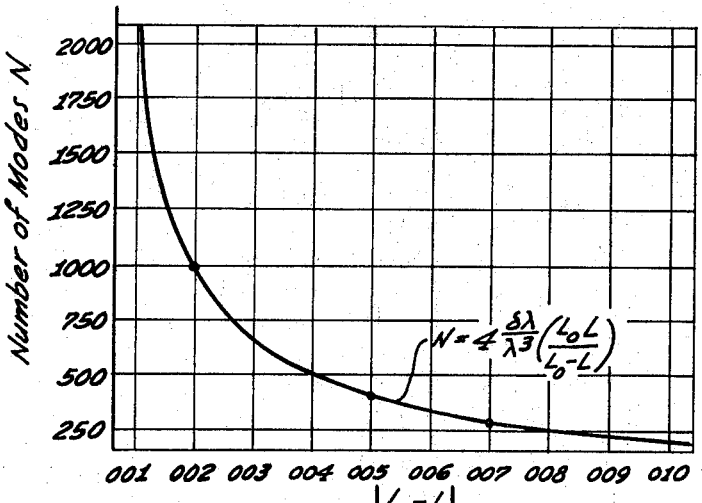
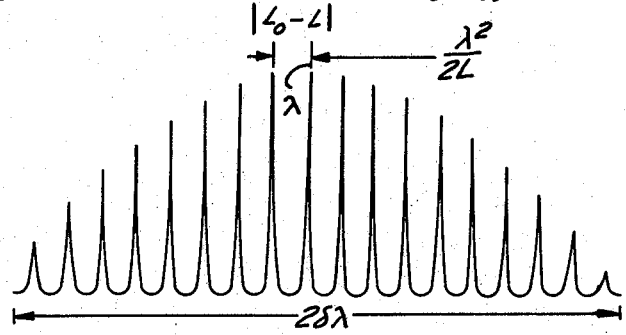
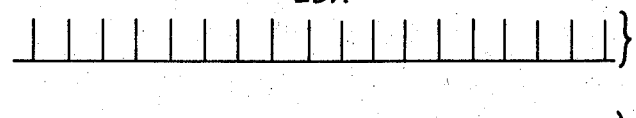
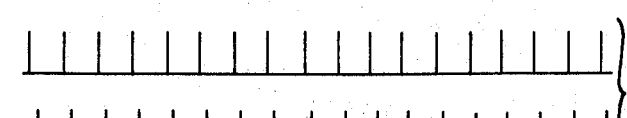
INVENTOR.
George L. Clark
ATTORNEYS

United States Patent Office 3,500,236
Patented Mar. 10, 1970

3,500,236
LASER STABILIZING SYSTEM
George L. Clark, Sierra Madre, Calif., assignor, by mesne assignments, to Xerox Corporation, a corporation of New York
Filed Oct. 28, 1966, Ser. No. 590,336
Int. Cl. H01s 3/10
U.S. Cl. 331—94.5
9 Claims

ABSTRACT OF THE DISCLOSURE

Two pairs of reflectors cooperating with a laser active material establish two laser cavities of differing lengths. They are mode-locked to intermode frequency separation corresponding to the average value of the two lengths. The output of the two cavities are compared and any difference is used to vary the length of the two cavities in unison.

---

The present invention relates to a laser stabilizing system wherein a modulator has been placed into a laser cavity which includes active laser material and at least two optically aligned reflectors. The optical distance between the reflectors or mirrors defines a resonant frequency or cavity fundamental the harmonies of which establish laser oscillator modes. Those modes which fall into the band of a fluorescent line of the active laser material are available for establishing laser modes, provided, of course, that the transition producing this line can be stimulated.

It has been shown that a modulator in the laser cavity, for example a phase or loss modulator can couple the modes in the line together and make them side bands of each other, provided the modulator frequency is at least substantially similar to the mode separation of the laser cavity modes. Under mode locked conditions the laser thus oscillates in modes with the inter-mode spacing being actually determined by the mode locking modulation frequency i.e. the intermode spacing then existing is exactly equal to the modulation frequency.

If the frequency at which the modulator is driven is known and controlled to a high degree of precision, and if the length of the laser cavity is such that mode locking is achieved under ideal conditions, then the mode frequencies will be known and conrolled with the same degree of precision, since the then existing modes are integral multiples of the modulation frequency which is equal to the cavity fundamental.

In general, the modulator is able to lock the modes of a laser together over a frequency interval centered at the frequency of the longitudinal mode separation of the laser cavity. This frequency interval is finite, as an absolute similarity between cavity fundamental and modulation frequency at all times is impossible, even if the modulation frequency is made to follow variations in the cavity length. The frequency interval of particular interest is the finite width of the fluorescent line used for laser operation. It is thus not necessary for the length of the laser cavity to be exactly controlled in order to achieve complete mode locking of all the modes in the line width. When mode locking is achieved the intermode frequency separation between locked modes is exactly that of the moderating frequency, even when the length of the laser cavity is not exactly correct for the modulation frequency. The coupling provided by the modulator is able to pull the modes away from the frequencies which they would have in the absence of the mode coupling and into a new relationship in which they are separated by exactly the modulation frequency.

It has now been shown and observed that the relationship between the cavity length and the modulation frequency affects the number of modes that can be coupled together in this manner, thereby affecting the peak power which can be achieved in the laser output device. Any mismatch, other than a minute one, between the modulation frequency and the set of mode frequencies defined by the laser cavity length will result in a reduction in the number of modes coupled, and, therefore, there will result a reduction in peak power output.

In normal laboratory laser oscillators the cavity length is not constant but is perturbed by acoustic vibrations, thermal changes and other external influences. These changes occur basically at random and wounld thus introduce random changes in the peak power output but not in the frequency as long as some mode locking is maintained. As was pointed out above, the frequencies of the laser mode are determined by the modulation frequency only in a mode locked operation.

The random changes of cavity length can now be controlled by measuring the variations in peak power output. For this purpose one of the reflectors defining the laser cavity is made with a small step, so that the cavity actually consists of two cavities of slightly different lengths. When the average of the two lengths is exactly right for mode locking, one of the cavities will be slightly too long and the other will be slightly too short, for complete mode locking, but if the average length is exactly midway between the two actual lengths, then the number of modes locked in each half of the split cavity will be the same as long as that average length defines a cavity fundamental equal to the modulation frequency. When all the modes which are locked together are also coupled out, the portions of the split beam will actually be identical in frequency, power and phase. If, however, the longitudinal dimensions as between this split mirror and the single back mirror is perturbed then one of the two lengths will have a value which is closer to the previous average length, and the length of the other cavity portion will be further from the previous average. The result of this is that the number of modes coupled in one half of the laser cavity will be increased or remain at maximum whereas the number of modes coupled in the other half will decrease. Thus, the two portions of the split beam will not have equal peak power any more, but within limits the average power of the entire beam will remain the same.

In operation, a single detector may, for example, be alternately illuminated from the two portions of the split laser beam withdrawn from the two different laser cavities, or one uses two detectors, one in the path of each portion of the laser beam, to accordingly provide electrical signals to be supplied to a differential amplifier. The differential amplifier furnishes a true error signal; the sign of the signal is indicative of the direction in which the average length of the laser cavity has changed, while the value of the error signal itself is indicative that a control action is required. The value of the error signal may even be directly indicative of the amount of control needed. One mirror of the cavity can be mounted on a transducer, for example, a piezo-electrical transducer to be driven by the error signal so that cavity length can be corrected.

Thereupon a closed feedback loop is established maintaining the number of modes coupled together in the entire laser cavity substantially constant.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 1 illustrates a block diagram representing somewhat schematically the essential elements of a laser and of a control loop for stabilizing the laser operation.

FIGURES 2A through to 2D illustrates pertinent modes plotted against frequency and for frequency values in the range of the fluorescent line used for laser operation, and FIGURE 3 illustrates the plot of a characteristic showing the number of modes coupled together for a particular modulating frequency plotted against deviations of the laser cavity length from the value for which the intermode frequency spacing corresponds to the modulator frequency.

Proceeding now to detailed descriptions of the drawings, in FIGURE 1 reference numeral 10 denotes an active laser material of any suitable kind. The longitudinal modes in the laser cavity are established by two reflectors 11 and 12. Reflector 11 is positioned on one side of the active laser material 10 while a split mirror 12 is positioned on the opposite side thereof.

The split mirror 12 is comprised of two semi-transparent portions 12a and 12b which are individually adjustable in longitudinal direction. The two semi-transparent mirrors 12a and 12b, each taken together with reflector 11 actually establish two longitudinal laser cavities in a side by side relationship and having respectively length $L_1$ and $L_2$.

Inside of the laser and particularly within both of these two laser cavities there is provided a modulator 13, for example, an electro-optical cell with variable dielectric constant for FM modulation or a cell of the electric valve type for loss modulating the laser beams so as to provide AM-modulation. The modulator 13 is controlled from an oscillator 14 serving as frequency standard. During normal and regular operation the oscillator 14 oscillates at a frequency $f_0$ which, when interpreted as a laser cavity fundamental corresponds to a longitudinal laser cavity length $L_0$. The relation is given by the formula $f_0 = C/2L_0$, where C is the velocity of light. The period $2L_0/C$ is the round trip time for a photon from any point in the cavity back to the same point after having been reflected by each of the two end mirrors defining the cavity. The two cavity lengths $L_1$ and $L_2$ as established now define $L_0$ as $$L_0 = \frac{L_1 + L_2}{2}$$

whereby it is understood that the laser system does not establish directly a cavity of the length $L_0$. The reasons for this will be developed more fully below.

Proceeding presently with the description of the block diagram of FIGURE 1 there is provided next a mirror 15 which responds to the two laser beams respectively leaving the two mirror portions 12a and 12b. If the side of the laser bounded by the mirrors 12 is also used for coupling out the radiation intended to be used, then the mirror 15 will be a semi-transparent mirror and, for example, the radiation propagating through the semi-transparent mirror 15 in longitudinal axial direction will be the useful beam. Even though there are actually two of those beams, they are phase coherent due to mode locking provided by modulator 13.

The portions of the radiation reflected by the mirror 15 are respectively detected by photoelectric detectors 16a and 16b, with detector 16a responding to the radiation having passed through the mirror 12a while the detector 16b responds to the radiation which is permitted to pass through the mirror 12b. The two detectors 16a and 16b form electrical signals which are individually fed to the two input terminals of a differential amplifier 17, the output of which depends on the difference in signal strength as provided by the two detectors 16a and 16b.

The sign of the output signal of amplifier 17 indicates which one of the two laser beams coupled out by the split mirror 12 has the higher peak power, and, depending on the transfer characteristics of the detectors and of the amplifier, the magnitude of this output signal may be proportionate to the difference in the peak power of the two laser beams, at least over a significant range. Therefore, the output of amplifier 17 is a true error signal as to the absence or presence of similarity of the two portions of the laser beam.

This error signal as provided by the differential amplifier 17 is used to drive, for example, a piezo-electric transducer 18 serving as a mounting and positioning element for the mirror 11; a feedback loop for the split laser cavity is established thereby. This feedback loop will tend to adjust the mirror 11 so that the resulting laser cavity lengths $L_1$ and $L_2$ are such that the signals as received by, as well as produced by, detectors 16a and 16b are equal in peak power. The reason for this result will now be elaborated upon in greater detail when considering the theory of opeartion of this laser control loop and stabilizing system.

In order to evaluate the operation of this system it is advisable to consider first open loop conditions and to consider the two laser cavities separately. It may, therefore, be assumed that the mirror 11 has a particular position and that, for example, the mirror 12a is adjusted in longitudinal direction so that a particular length is established for such a laser cavity; that length may be $L_0$. A laser cavity such as established by this adjustment provides for a plurality of oscillating modes. The modes are integral multiples of the cavity fundamental, now $C/2L_0$, and the modes are thus apart by that frequency.

If a particular fluorescent line of the laser material has been chosen for laser operation, a plurality of these laser modes will be within the frequency range covering the line width and oscillations of these modes can be sustained by the laser as optical resonator. The number of modes existing depends on the width of the fluorescent line chosen and on the spacing $L_0$. For a chosen line and a selected laser length the number of modes is fixed and can be regarded as the maximum number of modes available under the selected conditions. The contour of the fluorescent line used serves as gain curve for the modes within the line width. This is representatively shown in FIGURE 2A, which however must not be understood as being drawn to scale, as, for example, the number of modes existing in a line may be in the order of $10^2$.

As was said above the oscillator 14 provides a signal for the modulator 13 at the presently adjusted intra cavity frequency $C/2L_0$, thereby all of the laser modes are parametrically coupled, and they are all sidebands relative to each other. Under mode-locked conditions the laser will oscillate in the modes with the intermode spacing determined by the mode locking modulation frequency, which presently is also the cavity fundamental. If the frequency of the oscillator driving the modulator is controlled to a high degree of precision, and if the length of the laser cavity is such that complete mode locking is achieved, then all of the mode frequencies within the line are coupled to each other.

Due to this modulation the power output of the laser, i.e., the radiation which can be withdrawn, for example, through the mirror 12a is thus at maximum, as the modulation does not suppress any of the available cavity modes. FIGURE 2B depicts the modulation frequency sidebands in the frequency range of the fluorescent line used for laser operation. The alignment of the two mode series depicted in FIGURES 2A and 2B evidences complete parametric coupling of the modes regardless of whether or not the laser cavity modes themselves are completely independent from each other in the active material chosen.

If now the mirror 12a is position-adjusted, for example, towards an enlargement of the length of the laser cavity, then a mismatch is established between modulation modes and laser cavity modes. For a very slight mismatch the coupling provided by the modulator is still able to pull all of the cavity modes away from the frequencies which they would have in the absence of mode coupling. Thus, all of the operative laser modes are still separated by exactly the modulation frequency $C/2L_0$ and can all be sustained in the laser cavity.

However, if the enlargement of the cavity length is increased by shifting the mirror 12a to a still larger distance from reflector 11, a number of laser modes less than the maximum number which can be sustained in the laser cavity will be coupled by the modulation. In general, for a mismatch between the modulator frequency harmonics or modes and the laser cavity modes, the number of laser cavity modes still coupled to the modulator modes will depend on the degree of the mismatch, which in turn is represented by the deviation of the actual cavity length ($L_1$) from the length ($L_0$) for which the modulator frequency is the cavity fundamental, which in terms of the symbols introduced above is quantitatively represented by $|L_1-L_0|$.

At a mismatch above a threshold the modulator will not couple together all of the laser modes in the line frequency band, but only some thereof. Thus, the peak power as detected by the detector 16a will decrease and the output signal thereof will decline. Having once, by proper adjustment of mirror 12a and, for example, by trial and error, found the maximum peak power output, the decrease in peak power becomes in turn a representation for the mismatch $L_1-L_0$.

Now we consider the other half of the laser cavity, the length of which being governed by the mirror 12b. If initially that mirror 12b is also adjusted to establish a laser cavity of the length $L_0$, again for that laser cavity portion all laser mode frequencies will be coupled together by the modulation. As the mirror 12b is adjusted so that the laser cavity length decreases, the number of modes coupled together and the peak power will also decrease, and the signal established by detector 16b will decline.

The relationship between the number of modes still coupled together, and a mismatch represented numerically as $|L-L_0|$ is depicted in FIGURE 3. This figure can be interpreted for either case of mismatch of the existing laser length, and as adjustable by either one of the mirrors 12a and 12b. This adjustment runs from the length $L_0$, which corresponds to the modulator frequency, to any mismatch producing value L. In the formula written next to the plotted curve, $\lambda$ is the wavelength of the fluorescent line, and $2\delta\lambda$ is the line width.

In order to establish a suitable control range the two mirrors 12a and 12b may be adjusted as follows. Initially each of them is adjusted for maximum peak power output as stated, which means that for that particular adjustment both laser lengths are $L_0$. It is important that for that adjustment the exact numerical value of the adjusted length does not have to be known because maximum peak power output will exist, and existence thereof will be determined on the basis of the actual and measured peak power rather than on the basis of metering any length.

Now each of the mirrors 12a and 12b is adjusted individually; for example, the mirror 12a is shifted towards an enlargement of that portion of the laser cavity until the peak power output as detectable in the detector 16a is, for example, half of the maximum value. Analogously the mirror 12b is shifted by micrometer action for a decrease of the laser length cavity, and again until a position is obtained for which the output as detected in detector 16b is half of the maximum value. For this adjustment position of the two mirrors 12a and 12b the detectors 16a and 16b receive equal amounts of light, because the number of laser modes coupled together by modulation is the same in each cavity portion, or to state it differently, the match between the modulation and either cavity is equally good. The electrical outputs of the detectors are similar accordingly, and the output of the differential amplifier 17 producing an error signal will be zero.

If we now close the loop the particular position for the mirror 11 is presently maintained. Should, for reasons of thermal or acoustical vibrations, the length of the laser cavity vary, for example, increase, then the number of modes coupled by the modulation in the lower half of the laser cavity will increase and detector 16a will receive more peak power while the number of modes coupled together in the other half of the laser will decrease and the signals detected and furnished by detector 16b will decrease accordingly; the input balance for the differential amplifier 17 is now disturbed and an error signal having a non-zero value is produced.

The sign of the error signal is directly indicative of the direction in which the laser cavity changed its length. Depending upon the transfer characteristics of the several elements employed, the error signal may also be proportionate to the actual value of this change in average length of the split cavity. Therefore, the output of the differential amplifier 17 is in fact a true error signal which includes information regarding the existence of the error, the size of the error and the direction for which a controlled correction is needed.

The particular error signal will stimulate the transducer 18 to move the mirror 11 closer to the two mirrors 12a and 12b to thereby decrease the respective lengths of the two cavities in unison until the signals in detectors 16a and 16b are equal or substantially equal again. For a thermally induced decrease of the cavity length the control instigated runs in the opposite direction, i.e., towards the enlargement of the average length of the split laser cavity. The laser is thereby stabilized to the extent the source 14 provides a modulation of a constant frequency. The average power of both beams together remains substantially constant, even during the existence of an error signal as the result of differing peak powers of the two beams.

It is an important aspect of this arrangement that the frequency stability of the output withdrawn from the split mirror 12 does not depend upon the feedback loop. The speed and effectiveness of the loop determines only the amplitude stability of the output; the laser is stabilized towards a constant frequency all the same and to the extent the frequency of the oscillator 14 remains constant.

The mirror 11 or each one of the two mirrors 12a and 12b may for example be substituted by a Fabry-Perot etalon having one of its transmission modes atuned to one of the modulator modes; this way a single mode can be coupled out, the frequency stability of which again depends on the stability of the oscillator 14; the control provided by the loop will not affect the frequency of the output as long as the modulator mode to which the output etalons are atuned is never mismatched excessively to the particular mode intended to be coupled out from either portion of the cavity.

The following other modifications should be noted. The mirror 11 may actually remain in a fixed position and the transducer 18 may move a common mount for the mirror 12, whereby each portion thereof, 12a and 12b is individually adjustable in the common mount, but that adjustment is not activated during closed loop operation. Also, miror 11 may be an output coupler, for example a semitransparent reflector, a Fabry-Perot etalon, etc. In accordance with another modification, a single detector may be used and illuminated alternately from the portions of the output beams as "tapped" by reflector 15. The output signal of the single detector is then fed alternately to the two inputs of the differential amplifier 17 and in synchronism with the alternation of the illumination of the single detector form the two different beams.

The invention is not limited to the embodiments described above but all changes and modifications thereof not constituting departures from the spirit and scope of the invention are intended to be covered by the following claims:

What is claimed is:

1. In a laser oscillator system having an active laser material, the combination comprising:

a first and a second pair of reflectors positioned in relation to said material to define therewith two longitudinal, optical resonator cavities of differing lengths, at least one of the reflectors of each pair being semitransparent to establish two output laser beams;

means responsive to the intensity of each of said beams to provide an error signal representative of the difference of the intensities;

means for mode locking the laser so that the intermode frequency separation corresponds to an intracavity mode spacing for a cavity length in between said lengths; and means responsive to said error signal to vary said cavity lengths in unison.

2. In a laser system having an active laser material, the improvement comprising:

first reflecting means positioned in relation to the laser material;

a second and a third reflector each positioned in optical alignment with the first reflecting means and with the laser material to establish first and second laser cavities of different lengths to establish two different pluralities of laser cavity modes for two laser beams;

means for modulating the two laser beams in the first and second cavities by a frequency corresponding to an intracavity fundamental for a cavity length value in between said differing lengths;

means responsive to a particular characteristic of the two laser beams for detecting differences in the number of modes coupled together in each cavity and producing a signal representative of said differences; and means responsive to said signal for changing substantially similar numbers of modes coupled together in each cavity.

3. In a laser oscillator system wherein a laser-active material is bounded by two reflectors establishing a laser cavity having a particular number of intracavity modes:

means disposed in the cavity for modulating the laser by a frequency so that normally only some of said particular laser modes are coupled together;

means responsive to the laser output beam and providing a signal representative of the power of the beam;

means for providing a reference signal representing a number of modes coupled together; and means responsive to said first signal and to said reference signal for controlling the length of said cavity towards a value in which less than the particular number of laser modes are coupled together.

4. In a laser oscillator system having an active laser material, the combination comprising:

a first and a second pair of reflectors positioned in relation to said material to define therewith two longitudinal, optical resonator cavities of differing lengths, at least one of the reflectors of each pair being semitransparent to establish two output laser beams;

means disposed in the cavities for modulating said beams; and means responsive to the intensities of said beams for adjusting the spacings of said pairs of reflectors so that said intensities remain substantially similar.

5. In a laser oscillating system, wherein laser-active material is bounded by reflectors establishing a laser cavity having a particular number of intracavity modes as determined by its length, the combination comprising:

first means operating upon the laser for parametrically coupling the modes together, the first means capable of coupling maximum number of modes for a particular length of the cavity;

second means responsive to a first portion of the laser output beam and providing a first signal representative of the power of the beam;

third means responsive to a second portion of the laser output beam and providing a second signal; and fourth means connected to the second and third means for comparing the first and second signal and operating upon the laser cavity length to maintain the length at a value different from the particular length.

6. In a laser system as set forth in claim 5, the second signal varying in direction opposite to variation of the signal as provided by the second means upon operation of the fourth means.

7. In a laser system, wherein laser-active material is bounded by reflectors establishing a laser cavity having a particular number of natural, intracavity modes as determined by the length of the cavity, the combination comprising:

first means operating upon the laser for mode-locking intracavity modes together, less than the maximum of axial modes; and second means coupled to the laser cavity for controlling the length of the laser cavity to a value to maintain a particular mismatch between the intermode frequency spacing resulting from mode-locking as provided by the first means and the mutual mode spacing as determined by the actual laser cavity length at any instant.

8. In a laser system as set forth in claim 7, there being additional reflectors establishing a second laser cavity mode-locked for mismatch in relation to its natural mode spacing, the second means including third means for deriving control signals from the first and second cavities to control the length of the first laser cavity.

9. In a laser system as set forth in claim 8, one of the first and second laser cavities being too long, the other one too short, to respectively establish mismatch, the third means comparing outputs of the first and second laser cavities to vary the length of the first and second laser cavities in unison to maintain mismatch in each cavity.

References Cited

UNITED STATES PATENTS 3,252,110    5/1966    Gustafson et al. _____ 331—94.5

RONALD L. WIBERT, Primary Examiner

P. K. GODWIN, Jr., Assistant Examiner

U.S. Cl. X.R.

250—199; 330—4.3; 332—7.5, 7.51; 340—163